United States Patent Office 3,075,938
Patented Jan. 29, 1963

3,075,938
AQUEOUS COLLOIDAL DISPERSIONS CONTAINING HALOGENATED ACETYLENIC ALCOHOLS
Robert L. Johnson, Midland, Mich., assignor to The Dow Chemical Company, Midland, Mich., a corporation of Delaware
No Drawing. Filed June 25, 1959, Ser. No. 822,731
15 Claims. (Cl. 260—29.7)

This invention relates to improved aqueous colloidal dispersions. It is particularly concerned with compositions comprising synthetic latexes and a method for making such compositions.

Synthetic latexes have found widespread application in the protective coating field. In such usage, the latex or a composition containing it is applied to masonry, metal or wood surfaces whereby films are formed which tend to adhere to the solid surface and protect the latter against marring and weathering. The latexes commonly are modified by the addition of pigments and other agents to provide latex paint compositions which have desirable properties as regards ease of application, ease of clean-up, self-sealing, alkali resistance and odor. The synthetic latexes are also employed as saturants for papers to improve such properties as tear resistance or added to other compositions including other synthetic latexes to impart "stiffening" or other desirable properties for specific uses.

Certain problems have been encountered in the storage and application of synthetic latexes and compositions in which they are employed. For example, the synthetic latexes contain stabilizers and emulsifiers to maintain the polymer in the dispersed state. Many commonly employed stabilizers and emulsifiers are organic in nature and subject to attack by microorganisms. When the latexes are employed in latex paint formulations, they are modified with other additaments such as thickeners, pigment dispersants, other film forming modifiers and stabilizers which may also be subject to attack by microorganisms. The resultant microbiological activity frequently results in undesirable alterations in the viscosity of the latex paint system and unfavorably affects its spreading and odor characteristics.

In commercial latex and latex paint formulations, various preservatives have been employed to prevent attack by microorganisms. To accomplish such control with phenols and their salts it has been found necessary to maintain the latex compositions at a pH of 9 or higher. However, to minimize viscosity changes caused by hydrolytic breakdown of common protein components, prevent detinning of containers and permit general flexibility in manufacture and use, it is desirable that latex compositions be maintained at lower pH levels. Thus, the phenols and phenolates do not represent the ultimate as preservatives. Other preservatives such as organic mercury compounds, on the other hand, are not only hazardous because of toxicity but unfavorably affect color stability in certain formulations. Furthermore, certain preservatives undergo diminution in activity or reduction in killing power upon storage or standing on the shelf. This is of particular importance in latex paints which may be subject to subsequent infection by opening of containers, insertion of brushes, exposure to dust and other sources. Certain other preservatives frequently have adverse effects on the colloidal latex system when an amount sufficient to provide adequate protection is added.

Many preservatives are unsuitable in latexes and latex paints since they have been found to affect the films cast therefrom or affect the brushing and spreading characteristics. Further, with certain preservatives such as phenolic agents, a relatively high concentration is required which contributes to the problems of water sensitivity and spotting which are frequently encountered when films cast from present latex and latex paints are subjected to washing, spattering or to conditions which lead to condensation of water on coated surfaces. The desirability of the provisions of improved synthetic latex and latex containing compositions and of methods for avoiding the problems inherent in the applications of such compositions, is evident.

It is an object of the present invention to provide for improved compositions of aqueous colloidal dispersions comprising synthetic latexes characterized by properties of resistance to microbial attack and degradation. A further object is to provide an improved method for rendering compositions comprising synthetic latexes resistant to microbial attack and degradation. A still further object is to provide a method for producing latex paint compositions which are resistant to the attack of microorganisms. Other objects will become apparent from the following specification and claims.

According to the present invention, it has been discovered that improved aqueous colloidal dspersions comprising synthetic latexes are obtained when there is incorporated into the synthetic latex a minor and effective proportion of halognated acetylenic alcohol. These halogenated acetylenic alcohols are soluble in water and solvents in the amounts employed and when added to aqueous colloidal dispersions comprising synthetic latex impart thereto a preservative action, i.e., a property of resistance to microbially induced degradation even when added in amounts considerably less than that now employed with known preservatives.

Halogenated acetylenic alcohols suitable for the practice of this invention are alkynols containing a hydroxyl group on the carbon atom adjacent to the acetylenic carbon atom and containing a halogen atom on the aliphatic portion of the molecule.

The preferred halogenated acetylenic alcohols are those having the structure

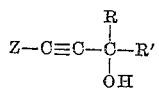

In this and succeeding formulas, R may be hydrogen or an alkyl group containing from 1 to 4 carbon atoms, inclusive, R' may be hydrogen, alkyl containing from 1 to 4 carbon atoms, inclusive, or phenyl, or R and R' taken together may be pentamethylene and Z may be chloro, bromo, iodo, chloromethyl, bromomethyl or iodomethyl.

A number of desirable properties characterize the aqueous colloidal dispersions provided by this invention. For example, all of the latex and latex paint compositions of the present invention are found to be resistant to microbial deterioration and without adverse effects on the color or other desirable properties of the latex. This protective action is observed on repeated inoculation of latex compositions with organisms normally present in water, soil and contaminated latex and latex paint. Furthermore, this action is observed throughout the acidic, neutral and alkaline pH range. In addition, the free films and/or coatings formed from such compositions exhibit stability against degradation such as discoloration, surface breakdown, peeling and water spotting suffered on exposure to heat, light and/or water that is frequently encountered in films formed from compositions modified by adding known preservatives. Thus, with latex and latex paint compositions containing halogenated acetylenic alcohols, films and coatings may be formed in which the desirable properties of the films and coatings formed from latex compositions containing no preservative are retained. Furthermore, latex compositions of this invention have the same non-hazardous properties as the latex compositions containing no added preservative.

The expression "synthetic latex" as herein employed is intended to mean any aqueous colloidal dispersion of polymers of polymerizable olefinically unsaturated monomers. Included also are polymers which have been modified by cross-linking. Examples of such polymeric materials are homopolymers and copolymers of monoethylenically unsaturated compounds such as styrene, acrylonitrile, acrylic and methacrylic esters, tetrafluoroethylene, vinyl halide, vinylidene halide, vinyl alcohol, and vinyl acetate; and copolymers of monoethylenically unsaturated compounds such as styrene and acrylonitrile with conjugated diolefins such as butadiene and chloroprene. The synthetic latexes are aqueous dispersions usually containing in addition to the polymer, an emulsifying agent and buffers. They may, in addition, contain other non-polymeric additives such as a plasticizer or stabilizer. Typical of the synthetic latexes with which this invention is concerned are those described in U.S. Patent No. 2,498,712. Emulsifying agents which may be employed include sodium oleate, sodium sulfate esters of higher alcohols, or sodium sulfonate of alkylated naphthalenes. Buffers which are oftentimes used include sodium bicarbonate and sodium tetraborate. These synthetic latexes are generally film forming but include as well those which are essentially non-film forming but which may be modified to become film forming or are used to impart desirable properties such as stiffness to soft film forming latexes or other materials such as papers, textiles and the like.

The term "latex paint" as herein employed refers to an aqueous colloidal dispersion containing a film forming synthetic latex composition as above defined to which has been added a pigment. The term "pigment" denotes colored as well as white pigments and is understood to be inclusive of mineral products used as fillers and extenders. Suitable pigment materials are well known and god results have been obtained when employing the lithopone, titanium dioxide, barium sulfate, calcium carbonate, clays, mica, talc, silica and the like in various combinations and proportions depending on the end use for which the paint is designed. Colored pigments and dyes which have been found compatible in these compositions include benzylidene yellow, cadmium yellow, iron oxides, toluidine toners, sienna, amber and ultramarine blues. Suitable pigment dispersants such as tetrasodium pyrophosphate, lecithin, gum arabic and numerous synthetic surface active agents such as sodium lauryl sulfate, lauryl ammonium acetate and glyceryl monolaurate may be employed. In addition, thickeners, colloid stabilizers, modifiers, defoamers and other paint-making ingredients may be present in latex paint. These ingredients and latex paint compositions containing them are extensively described in the art, e.g., in U.S. Patent No. 2,498,712. Colloid stabilizers, thickeners, and modifiers which may be used include casein, α-protein, polyacrylates, alginates, alkyd resins and water-soluble cellulose derivatives. Defoamers include kerosene, pine oil, octyl alcohol, tributyl phosphate, and numerous others available under trade names.

The preferred polymeric materials to be contained in the synthetic latexes in accordance with the present invention are copolymers prepared from 25–75 percent of at least one conjugated aliphatic diolefin and 75–25 percent of at least one vinyl aromatic compound. Typical conjugated diolefins are butadiene and isoprene. Typical vinyl aromatic compounds are hydrocarbons of the benzene series having a vinyl group on a benzene or substituted benzene nucleus such as styrene and vinyltoluene.

The halogenated acetylenic alcohols with which the present invention is concerned may be employed in any antimicrobial amount. While good results have been obtained with from 0.001 to 1 percent by weight of the halogenated acetylenic alcohol when based on the total wet weight of synthetic latex, the range of from 0.001 to 0.2 percent by weight is preferred. In preparing the improved aqueous colloidal dispersion, the halogenated acetylenic alcohol is blended with the synthetic latex by mechanical mixing. The halogenated acetylenic alcohol is usually first dissolved in water, ethanol, methanol, 50:50 methanol-water or other suitable solvent and thereafter introduced into the latex with agitation in the temperature range of from 18° to 45° C. Good results have been obtained by employing water, alcohol-water or alcoholic solutions containing 10 to 50 percent by weight of the halogenated acetylenic alcohol.

When the aqueous colloidal dispersion is a latex paint, good results have been obtained when the halogenated acetylenic alcohol is employed in an amount of from about 0.01 to 1.0 percent by weight. This percentage by weight is calculated on the basis of the weight of the halogenated acetylenic alcohol and the total wet weight of the paint employed. It is preferred that from 0.05 to 0.2 percent by weight of the halogenated acetylenic alcohol be added to the latex paint. The incorporation of the halogenated acetylenic alcohol into the paint may be made at any point in its manufacture. It may be introduced before or after the addition of the pigment dispersion to the latex or added to said dispersion. Conveniently, a solution of the halogenated acetylenic alcohol may be blended into the formulated latex paint.

Representative synthetic latexes may be prepared by polymerizing mixtures of suitable monomeric compounds in aqueous emulsion in accordance with known procedures. As described in U.S. Patent No. 2,498,712, the polymerizable compounds, in proportions corresponding to the desired composition of the polymeric product, may be mixed with an aqueous solution of an emulsifying agent and the mixture agitated to effect emulsification. The emulsifying agent is ordinarily employed in an amount corresponding to from 0.5 to 5 percent of the weight of the polymerizable organic compounds, but it may be used in smaller or larger proportions. A catalyst such as a peroxide is usually added in an amount corresponding to from 0.5 to 4 percent of the weight of the compounds to be polymerized, but is not always required. A buffer may be added if desired. The emulsion is heated in a closed container, generally at temperatures between 50° and 100° C. to effect polymerization. After completion of the polymerization, the property of the resulting polymeric dispersion may be modified, if desired, by the incorporation in the dispersion of other additives such as plasticizers or stabilizers.

An example of synthetic latexes which may be employed is a GRS type latex. A representative latex is an approximately 35 percent aqueous colloidal dispersion containing a copolymer of approximately 50 percent butadiene and 50 percent styrene prepared by emulsion polymerization. This latex may be prepared by charging a reactor with the following:

| | Parts by weight |
|---|---|
| Butadiene | 18.0 |
| Styrene | 18.0 |
| Water | 64.0 |
| Emulsifier (soap flakes) | 1.54 |
| Catalyst (potassium persulfate) | 0.090 |

The mixture is then agitated to effect emulsification and heated at a temperature of 50° C. for 23 hours to cause polymerization. A post-stabilizer (35 percent solution of potassium oleate) is added to the resultant latex in the ratio of 4.71 parts by weight of post-stabilizer for every 90 parts by weight of latex and the mixture then heated to steam distill the volatiles and recover an approximately 50:50 styrene-butadiene copolymer latex of 35 percent solids content.

The synthetic latex thus prepared may be employed for the preparation of a paint emulsion. A typical latex paint may be formulated by blending together 69 parts by weight of latex with 100 parts by weight of pigment paste having the following composition:

Ingredient: Parts by weight
  Water _____ 10.1
  Sodium pyrophosphate ($Na_2P_2O_7 \cdot 10H_2O$)____ 0.5
  Titanium dioxide_____ 47.0
  Lithopone _____ 13.4
  Mica _____ 6.7
  α-Protein (10 percent solution)_____ 19.1
  Pine oil_____ 0.8
  Tributyl phosphate_____ 2.5

Variations may be made in the above formula as will be apparent to those skilled in the art.

The halogenated acetylenic alcohols having the structure

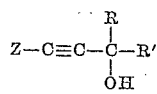

may be readily prepared by known methods. The chloro-substituted-acetylenic alcohols represented by the structure

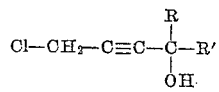

may be prepared by treating one mole equivalent of an acetylenic-diol represented by the structure

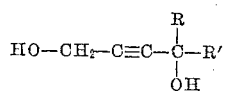

with approximately 1 mole equivalent of thionyl chloride and one mole equivalent of pyridine in an inert solvent such as benzene in the temperature range of from about 30° to 80° C. for from 3 to 18 hours and thereafter recovering the desired product by distillation procedures. The halogenated acetylenic alcohols represented by the structure

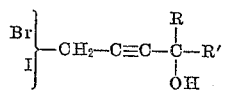

may be prepared by refluxing the corresponding chloro-substituted acetylenic alcohol with sodium bromide or sodium iodide in an alcoholic solvent such as methanol for from 10 to 24 hours.

The halogenated acetylenic alcohols represented by the structure

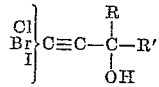

may be prepared by reacting an acetylenic alcohol having the structure

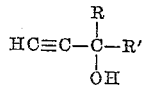

with the appropriate sodium hypohalite solution in the temperature range of from 0° to 10° C. for a period of from 1 to 3 hours and thereafter recovering the product by conventional procedures, such as by solvent extraction.

The following examples illustrate the invention but are not to be construed as limiting.

EXAMPLE 1

A synthetic GRS type latex of 50 percent styrene-50 percent butadiene prepared as previously described was modified by adding varying amounts of 3-iodo-2-propyn-1-ol to produce modified compositions containing varying concentrations of the halogenated acetylenic alcohol. These latex compositions as well as a control containing no 3-iodo-2-propyn-1-ol were then inoculated with a mixed culture of seventeen organisms consisting largely of Pseudomonas, Bacillus and Proteus species, previously isolated from spoiled samples of latex and latex paint. Fifty gram portions of the various modified and unmodified latex compositions were inoculated with 0.05 milliliter portions of a 24 hour nutrient broth culture of the mixed organisms and maintained at 30° C. At various intervals after inoculation, multiple streaks were made from these samples on poured nutrient agar plates and the streaked plates incubated at 30° C. for 48 hours. At the end of this period, the plates were examined for microbial growth. The results obtained are set forth in Table I.

*Table I*

| Concentration in percent by weight | Microbial growth at— | | |
|---|---|---|---|
| | 24 hours | 1 week | 2 weeks |
| 0.5 | None | None | None. |
| 0.1 | do | do | Do. |
| 0.05 | do | do | Do. |
| 0.03 | do | do | Do. |
| 0.01 | do | do | Do. |
| None (control) | Heavy | Heavy | Heavy. |

EXAMPLE 2

Synthetic latexes including commerically available latexes produced from the various monomers were modified by the addition of 3-iodo-2-propyn-1-ol to give a series of latexes containing 0.1 percent by weight of 3-iodo-2-propyn-1-ol based on the total weight of latex. Fifty gram portions of the modified as well as unmodified samples were inoculated with 0.05 milliliter portions of a 24 hour nutrient broth culture of the same mixed organisms employed in Example 1, and maintained at 30° C. At various intervals after inoculation multiple streaks were made on agar plates and the latter incubated at 30° C. for 48 hours and thereafter examined as described in Example 1. The results are set forth in Table II.

*Table II*

| Latex | Concentration in percent by weight | Microbial growth at— | | |
|---|---|---|---|---|
| | | 24 hours | 1 week | 2 weeks |
| Elvacet 81-900 [1] | 0.1 | None | None | None. |
| Do.[1] | None | Heavy | Heavy | Heavy. |
| Lytron 615 [2] | 0.1 | Trace | Trace | Trace. |
| Do.[2] | None | Heavy | Heavy | Heavy. |

[1] Commercial polyvinylacetate latex.
[2] Commercial polystyrene latex.

EXAMPLE 3

Commercially available synthetic latexes were modified by the addition of 3-iodo-2-propyn-1-ol to give a series of latexes containing various concentrations of the halogenated acetylenic alcohol based on the total weight of latex. Fifty gram portions of the modified as well as unmodified samples were inoculated with 0.05 milliliter portions of a mixed culture of organisms previously described and maintained at 30° C. At various intervals after inoculation, samples were streaked, incubated and observed as described in Example 1. The results are set forth in Table III.

Table III

| Latex | Concentration in percent by weight | Interval after inoculation | Microbial growth |
|---|---|---|---|
| Naugatuck 2000 [1] | 0.1 | 1 week | None. |
| Do.[1] | 0.05 | do | Do. |
| Do.[1] | 0.01 | do | Do. |
| Do.[1] | None | do | Heavy. |
| Do.[1] | 0.1 | 2 weeks | None. |
| Do.[1] | 0.05 | do | Do. |
| Do.[1] | 0.01 | do | Do. |
| Do.[1] | None | do | Heavy. |
| Rhoplex AC-33 [2] | 0.1 | 1 week | None. |
| Do.[2] | 0.05 | do | Do. |
| Do.[2] | 0.03 | do | Do. |
| Do.[2] | None | do | Heavy. |
| Do.[2] | 0.1 | 2 weeks | None. |
| Do.[2] | 0.05 | do | Do. |
| Do.[2] | 0.03 | do | Do. |
| Do.[2] | None | do | Heavy. |

[1] Commercial GRS latex.
[2] Commercial ethyl acrylate-methyl methacrylate copolymer latex.

EXAMPLE 4

In a similar manner, 3-iodo-2-propyn-1-ol was added to commercial styrene-butadiene copolymer latex to produce a modified latex composition containing the halogenated acetylenic alcohol in varying concentrations. Fifty gram samples were inoculated with 0.1 milliliter portions of a mixed culture of organisms and maintained at about 25° C. At various intervals after inoculation, samples were streaked, incubated and observed as described in Example 1. Unmodified latexes were treated in a similar manner and employed as controls. The results obtained are set forth in Table IV.

Table IV

| Latex | Concentration in percent by weight | Microbial growth at— | | |
|---|---|---|---|---|
| | | 24 hours | 1 week | 2 weeks |
| Dow Latex 512-R[1] | 0.1 | None | None | None. |
| Do.[1] | 0.05 | do | do | Do. |
| Do.[1] | 0.01 | do | do | Do. |
| Dow Latex 512-R[1] (control). | None | Heavy | Heavy | Heavy. |
| Dow Latex 512-K[2] | 0.1 | None | None | None. |
| Do.[2] | 0.05 | do | do | Do. |
| Do.[2] | 0.01 | do | do | Do. |
| Dow Latex 512-K[2] (control). | None | Heavy | Heavy | Heavy. |
| Dow Latex 762-W[3] | 0.1 | None | None | None. |
| Do.[3] | 0.05 | do | do | Do. |
| Do.[3] | 0.01 | Some | do | Do. |
| Dow Latex 762-W[3] (control). | None | Heavy | Heavy | Heavy. |

[1] Commercial 60 percent styrene-40 percent butadiene copolymer latex, 48 percent solids.
[2] Commercial 60 percent styrene-40 percent butadiene copolymer latex, 48 percent solids.
[3] Commercial 67 percent styrene-33 percent butadiene copolymer latex, 48 percent solids.

EXAMPLE 5

In a similar manner, a synthetic GRS type latex of 50 percent styrene—50 percent butadiene of the composition previously described was modified by adding various halogenated acetylenic alcohols in varying concentrations. Fifty gram portions of modified as well as unmodified control samples were inoculated with 0.05 milliliter portions of a mixed culture of organisms as previously described and maintained at 30° C. for 1 week. The samples were then streaked, incubated and observed as described in Example 1. The results are set forth in Table V.

Table V

| Halogenated acetylenic alcohol | Concentration | Microbial growth |
|---|---|---|
| 2-chloro-2-butyn-1-ol | 0.1 | None. |
| 4-iodo-3-butyn-2-ol | 0.01 | Do. |
| 3-bromo-2-propyn-1-ol | 0.1 | Do. |
| 4-bromo-2-butyn-1-ol | 0.05 | Do. |
| None (control) | None | Heavy. |

EXAMPLE 6

Synthetic latexes including commercially available latexes produced from various monomers were modified by the addition of a halogenated acetylenic alcohol to give a series of latexes containing various concentrations of a halogenated acetylenic alcohol based on the total weight of latex. Fifty gram portions of the modified as well as unmodified samples were inoculated with 0.05 milliliter portions of a mixed culture of organisms as previously described and maintained at 30° C. for 1 week. Multiple streaks were made on agar plates and the latter incubated at 30° C. for 48 hours and thereafter examined as described in Example 1. The results are set forth in Table VI.

Table VI

| Halogenated acetylenic alcohol | Concentration in percent by weight | Latex | Microbial growth |
|---|---|---|---|
| 4-chloro-2-butyn-1-ol | 0.1 | FRS-2000 [1] | None. |
| Do | 0.01 | do[1] | Do. |
| 4-iodo-3-butyn-2-ol | 0.1 | do[1] | Do. |
| Do | 0.01 | do[1] | Do. |
| Do | 0.005 | do[1] | Do. |
| 3-bromo-2-propyn-1-ol | 0.1 | do[1] | Do. |
| Do | 0.05 | do[1] | Do. |
| Do | 0.005 | do[1] | Do. |
| 4-bromo-2-butyn-1-ol | 0.05 | do[1] | Do. |
| Do | 0.01 | do[1] | Do. |
| Do | 0.005 | do[1] | Do. |
| α-(iodoethynyl)benzyl alcohol | 0.1 | do[1] | Do. |
| Do | 0.005 | do[1] | Do. |
| None (control) | None | do[1] | Heavy. |
| 4-chloro-2-butyn-1-ol | 0.1 | Elvacet 81-900 | None. |
| Do | 0.005 | do | Do. |
| 4-iodo-s-butyn-2-ol | 0.1 | do | Do. |
| Do | 0.05 | do | Do. |
| 3-bromo-2-propyn-1-ol | 0.05 | do | Do. |
| Do | 0.005 | do | Do. |
| 4-bromo-2-butyn-1-ol | 0.01 | do | Do. |
| Do | 0.005 | do | Do. |
| α-(iodoethynyl)benzyl alcohol | 0.1 | do | Do. |
| Do | 0.05 | do | Do. |
| None (control) | None | do | Heavy. |
| 4-chloro-2-butyn-1-ol | 0.1 | Lytron 615 | None. |
| Do | 0.005 | do | Do. |
| 4-iodo-3-butyn-2-ol | 0.05 | do | Do. |
| Do | 0.005 | do | Do. |
| 3-bromo-2-propyn-1-ol | 0.01 | do | Do. |
| Do | 0.005 | do | Do. |
| 4-bromo-2-butyn-1-ol | 0.05 | do | Do. |
| Do | 0.005 | do | Do. |
| α-(iodoethynyl)benzyl alcohol | 0.1 | do | Do. |
| Do | 0.005 | do | Do. |
| None (control) | None | do | Heavy. |
| 4-chloro-2-butyn-1-ol | 0.1 | Rhoplex AC-33 | None. |
| Do | 0.05 | do | Trace. |
| Do | 0.05 | do | None. |
| Do | 0.01 | do | Do. |
| 4-iodo-3-butyn-2-ol | 0.1 | do | Do. |
| 3-bromo-2-propyn-1-ol | 0.05 | do | Do. |
| 4-bromo-2-butyn-1-ol | 0.01 | do | Do. |
| Do | 0.05 | do | Do. |
| α-(iodoethynyl)benzyl alcohol | 0.1 | do | Do. |
| None (control) | None | do | Heavy. |
| 4-chloro-2-butyn-1-ol | 0.005 | Geon 576 [2] | None. |
| 4-iodo-3-butyn-2-ol | 0.1 | do.[2] | Do. |
| Do | 0.005 | do.[2] | Do. |
| 3-bromo-2-propyn-1-ol | 0.05 | do.[2] | Do. |
| Do | 0.005 | do.[2] | Do. |
| 4-bromo-2-butyn-1-ol | 0.05 | do.[2] | Do. |
| Do | 0.01 | do.[2] | Do. |
| α-(iodoethynyl)benzyl alcohol | 0.005 | do.[2] | Do. |
| None (control) | None | do.[2] | Heavy. |

[1] Commercial GRS latex.
[2] Commercial polyvinylchloride latex.

EXAMPLE 7

In a similar manner, commercially available styrene-butadiene latexes were modified by the addition of halogenated acetylenic alcohol and inoculated as above described. The inoculated samples were maintained at 30° C. for varying intervals, and then streaked, incubated and observed as described in Example 1. The results are set forth in Table VII.

Table VII

| Halogenated acetylenic alcohol | Concentration in percent by weight | Latex | Microbial growth at— | | |
|---|---|---|---|---|---|
| | | | 24 hours | 1 week | 2 weeks |
| 4-bromo-2-butyn-1-ol | 0.05 | Dow Latex 512-K | None | None | None. |
| 4-chloro-2-butyn-1-ol | 0.05 | do | do | do | Do. |
| 1-iodo-3-methyl-1-pentyn-3-ol | 0.01 | do | Trace | do | Do. |
| 4-iodo-2-methyl-3-butyn-2-ol | 0.1 | do | None | do | Do. |
| 4-iodo-3-butyn-2-ol | 0.05 | do | do | do | Do. |
| α-(Iodoethynyl)-benzyl alcohol | 0.05 | do | do | do | Do. |
| 1-(iodoethynyl)-cyclohexanol | 0.05 | do | do | do | Do. |
| 1-iodo-3,5-dimethyl-1-hexyn-3-ol | 0.05 | do | do | do | Do. |
| 3-bromo-2-propyn-1-ol | 0.05 | do | do | do | Do. |
| None (control) | None | do | Heavy | Heavy | Heavy. |
| 4-bromo-2-butyn-1-ol | 0.05 | Dow Latex 512-R | None | None | None. |
| 4-chloro-2-butyn-1-ol | 0.05 | do | do | do | Do. |
| 1-iodo-3-methyl-1-pentyn-3-ol | 0.1 | do | do | do | Do. |
| 4-iodo-2-methyl-3-butyn-2-ol | 0.1 | do | Trace | do | Do. |
| 4-iodo-3-butyn-2-ol | 0.05 | do | None | do | Do. |
| α-(Iodoethynyl)-benzyl alcohol | 0.05 | do | do | do | Do. |
| 1-(iodoethynyl)-cyclohexanol | 0.05 | do | do | do | Do. |
| 1-iodo-3,5-dimethyl-1-hexyn-3-ol | 0.05 | do | do | do | Do. |
| 3-bromo-2-propyn-1-ol | 0.05 | do | do | do | Do. |
| None (control) | None | do | Heavy | Heavy | Heavy. |
| 4-bromo-2-butyn-1-ol | 0.05 | Dow Latex 762-W | None | None | None. |
| 1-iodo-3-methyl-1-pentyn-3-ol | 0.1 | do | do | do | Do. |
| 4-iodo-2-methyl-3-butyn-2-ol | 0.1 | do | do | do | Do. |
| 4-iodo-3-butyn-2-ol | 0.05 | do | do | do | Do. |
| α-(iodoethnyl)-benzyl alcohol | 0.05 | do | do | do | Do. |
| 1-(iodoethynyl)-cyclohexanol | 0.05 | do | do | do | Do. |
| 1-iodo-3,5-di-methyl-1-hexyn-3-ol | 0.05 | do | do | do | Do. |
| 3-bromo-2-propyn-1-ol | 0.05 | do | do | do | Do. |
| None (control) | None | do | Heavy | Heavy | Heavy. |

EXAMPLE 8

In a similar manner, commercial polystyrene latex (Dow Latex 586) was modified by the addition of halogenated acetylenic alcohol and inoculated as previously described. The inoculated samples were maintained at 30° C. for varying intervals, and then streaked, incubated and observed as described in Example 1. The results were as follows:

Table VIII

| Halogenated acetylenic alcohol | Concentration in percent by weight | Microbial growth at— | | |
|---|---|---|---|---|
| | | 24 hours | 1 week | 2 weeks |
| 3-iodo-2-propyn-1-ol | 0.1 | None | None | None. |
| Do | 0.05 | do | do | Do. |
| Do | 0.01 | do | do | Do. |
| 4-bromo-2-butyn-1-ol | 0.1 | do | do | Do. |
| Do | 0.05 | Trace | do | Do. |
| Do | 0.01 | Some | Trace | Do. |
| None (control) | None | Heavy | Heavy | Heavy. |

EXAMPLE 9

1-(bromoethynyl)cyclohexanol is intimately dispersed in a 50 percent styrene-50 percent butadiene copolymer latex having a 40 percent solids composition to produce a modified latex composition containing 0.05 percent by weight of 1-(bromoethynyl)cyclohexanol.

1-(chloroethynyl)cyclohexanol is intimately dispersed in a commercial 65 percent styrene-35 percent butadiene copolymer latex having a 48 percent solids composition to produce a modified latex composition containing 0.01 percent by weight of 1-(chloroethynyl)cyclohexanol.

1-iodo-3,5-dimethyl-1-hexyl-3-ol is intimately dispersed in a commercial vinylidene chloride-acrylonitrile copolymer latex having a 51.5-53 percent solids composition to produce a modified latex composition containing 0.1 percent by weight of 1-iodo-3,5-dimethyl-1-hexyn-3-ol.

1-bromo-3-ethyl-1-pentyn-3-ol is intimately dispersed in a commercial polystyrene latex having a 49.5 percent solids content to produce a modified latex composition containing 0.005 percent by weight of 1-bromo-3-ethyl-1-pentyn-3-ol.

α-(Iodoethynyl)-α-(normal-butyl)benzyl alcohol is intimately dispersed in a commercial acrylonitrile-butadiene copolymer latex to produce a modified latex composition containing 0.1 percent by weight of α-(iodoethynyl)-α-(normal-butyl)benzyl alcohol.

These modified latex compositions are resistant to microbially induced degradation.

*Example 10*

A latex paint formulation employing a synthetic GRS type latex comprising a copolymer of 50 percent styrene and 50 percent butadiene and prepared as previously described was modified by adding various halogenated acetylenic alcohols at varying concentrations to produce modified paint compositions. Each modified paint sample as well as unmodified paint sample was then inoculated with a mixed culture of organisms previously described and maintained for four weeks at about 30° C., and then streaked and incubated as previously set forth. The following results were observed on examination of the streaks after the period of incubation (Table IX):

Table IX

| Halogenated acetylenic alcohol | Concentration in percent by weight | Control of microbial growth |
|---|---|---|
| 4-iodo-3-butyn-2-ol | 0.2 | Excellent. |
| Do | 0.1 | Do. |
| Do | 0.05 | Do. |
| 4-chloro-2-butyn-1-ol | 0.2 | Do. |
| Do | 0.1 | Do. |
| 3-bromo-2-propyn-1-ol | 0.2 | Do. |
| 4-bromo-2-butyn-1-ol | 0.2 | Do. |
| None (control) | None | None. |

EXAMPLE 11

A latex paint was made by intimately blending in a conventional manner 100 grams of a pigment dispersion of the following composition:

| Ingredient— | | Amount |
|---|---|---|
| Water | milliliters | 807 |
| Sodium pyrophosphate ($Na_4P_2O_7 \cdot 10H_2O$) | grams | 43.44 |
| Titanium dioxide | do | 3726 |
| Lithopone | do | 1064.4 |
| Ground mica | do | 529.8 |
| α-Protein (10 percent) | do | 1515.6 |
| Pine oil | do | 63.3 |
| Tributyl phosphate | do | 201 | with 69 grams of various commercial latex film forming agents. The latex paint compositions were then modified to give compositions containing a halogenated acetylenic alcohol in varying concentrations. Fifty gram samples of modified paint were inoculated with 0.05 milliliter of a mixed culture of organisms previously described and maintained for four weeks at 30° C., and thereafter streaked, incubated and observed as described in Example 1. The results were as follows:

*Table X*

| Halogenated acetylenic alcohol | Latex | Concentration of halogenated acetylenic alcohol in percent by weight | Control of microbial growth |
|---|---|---|---|
| 4-iodo-3-buyn-2-ol | Dow Latex 762-W | 0.1 | Good. |
| Do | do | 0.05 | Do. |
| Do | Dow Latex 512-K | 0.2 | Do. |
| Do | do | 0.05 | Do. |
| 4-chloro-2-butyn-1-ol | Dow Latex 762-W | 0.1 | Excellent. |
| Do | do | 0.05 | Do. |
| Do | Dow Latex 512-K | 0.2 | Do. |
| Do | do | 0.1 | Good. |
| 4-bromo-2-butyn-1-ol | Dow Latex 762-W | 0.2 | Excellent. |
| Do | do | 0.1 | Do. |
| Do | Dow Latex 512-K | 0.2 | Do. |
| Do | do | 0.1 | Do. |
| None (control) | Dow Latex 762-W | None | None. |
| Do | Dow Latex 512-K | None | Do. |

EXAMPLE 12

In a further operation, a latex paint having the following formulation was prepared:

Pigment grind—                                  Pounds/100 gallons
Water _____ 250
Tamol 731 (25 percent)[1] _____ 6
Casein (15 percent, NH₄OH) cut _____ 75
Titanium dioxide _____ 210
Clay _____ 75
Diatomaceous silica _____ 35
Calcium carbonate _____ 125
Polyglycol P-1200 [2] _____ 5
Nopco JMK [3]/water (1/1) _____ 6
Diethylene glycol _____ 15
Rhoplex AC-33 _____ 350

[1] Anionic surfactant, sodium salt of carboxylated polyelectrolyte.
[2] Polypropylene glycol, average molecular weight 1200.
[3] Commercial defoamer.

The latex paint composition was then modified to give compositions containing a halogenated acetylenic alcohol in varying concentrations. Fifty gram samples of a mixed culture of organisms previously described was maintained for four weeks at 30° C., and thereafter streaked, incubated, and observed as described in Example 1. The results were as follows:

*Table XI*

| Halogenated acetylenic alcohol | Concentration of halogenated acetylenic alcohol in percent by weight | Control of microbial growth |
|---|---|---|
| 4-iodo-3-butyn-2-ol | 0.2 | Good. |
| 4-bromo-2-butyn-1-ol | 0.2 | Excellent. |
| Do | 0.1 | Good. |
| None (control) | None | None. |

EXAMPLE 13

In a still further operation, a latex paint having the following formulation was prepared:

Pigment grind—                                  Pounds/100 gallons
Dibutyl phthalate _____ 8
Tergitol NP-14 [1] _____ 5
Lecithin _____ 7
Potassium carbonate _____ 1
Ethylene glycol _____ 18
Diethylene glycol monoethyl ether _____ 17
Titanium dioxide _____ 225
Talc _____ 150
Calcium carbonate _____ 175
Water _____ 291
Foamicide 581-B [2] _____ 2
Paint reduction—
Methylcellulose, 4000 cps., 2 percent _____ 175
Celanese 102 [3] _____ 266

[1] An alkyl phenyl polyethylene glycol ether.
[2] Commercial defoamer.
[3] Commercial polyvinylacetate homopolymer latex.

The latex paint composition was then modified to give a composition containing 4-chloro-2-butyn-1-ol in varying concentrations. Fifty gram samples of modified paint were inoculated with 0.05 milliliter of a mixed culture of organisms previously described and maintained for four weeks at 30° C., and thereafter streaked, incubated and observed as described in Example 1. The results were as follows:

| Concentration of 4-chloro-2-butyn-1-ol in percent by weight | Control of microbial growth |
|---|---|
| 0.2 | Excellent. |
| 0.1 | Good. |
| 0.05 | Do. |
| None (control) | None. |

I claim:
1. An aqueous colloidal dispersion comprising (1) a synthetic latex containing in the disperse phase a polymer of at least one olefinically unsaturated monomer and (2) from about 0.001 to 1 percent by weight of a halogenated acetylenic alcohol wherein the amount is based on the total weight of synthetic latex and wherein said halogenated acetylenic alcohols are alkynols containing a hydroxyl group on the carbon atom adjacent to the acetylenic carbon atom and containing a halogen atom on the aliphatic portion of the molecule.

2. An aqueous colloidal dispersion comprising (1) a synthetic latex containing in the disperse phase a copolymer of a conjugated diolefin and a vinyl-aromatic compound of the benzene series and (2) from about 0.001 to 1 percent by weight of a halogenated acetylenic alcohol wherein the amount is based on the total weight of synthetic latex and wherein said halogenated acetylenic alcohols are alkynols containing a hydroxyl group on the carbon atom adjacent to the acetylenic carbon atom and containing a halogen atom on the aliphatic portion of the molecule.

3. An aqueous colloidal dispersion comprising (1) a synthetic latex containing in the disperse phase a copolymer of from 25 percent to 75 percent of butadiene and correspondingly from 75 percent to 25 percent by weight of a vinyl-aromatic hydrocarbon of the benzene series, and (2) from about 0.001 to 1 percent by weight of a halogenated acetylenic alcohol wherein the amount is based on the total weight of synthetic latex and wherein said halogenated acetylenic alcohols are alkynols containing a hydroxyl group on the carbon atom adjacent to the acetylenic carbon atom and containing a halogen atom on the aliphatic portion of the molecule.

4. An aqueous colloidal dispersion comprising a synthetic latex containing in the disperse phase a polymer of at least one olefinically unsaturated monomer having intimately blended therein from about 0.001 to 1 percent by weight of a halogenated acetylenic alcohol wherein the amount is based on the total weight of synthetic latex and wherein said halogenated acetylenic alcohols are alkynols containing a hydroxyl group on the carbon atom adjacent to the acetylenic carbon atom and containing a halogen atom on the aliphatic portion of the molecule.

5. An aqueous colloidal dispersion comprising a synthetic latex containing in the disperse phase a polymer of at least one olefinically unsaturated monomer having intimately blended therein from 0.001 to 0.2 percent by weight of a halogenated acetylenic alcohol wherein the amount is based on the total weight of synthetic latex and wherein said halogenated acetylenic alcohols are alkynols containing a hydroxyl group on the carbon atom adjacent to the acetylenic carbon atom and containing a halogen atom on the aliphatic portion of the molecule.

6. An aqueous colloidal dispersion comprising (1) a synthetic latex containing in the disperse phase a polymer of at least one olefinically unsaturated monomer and (2) a halogenated acetylenic alcohol having the structure

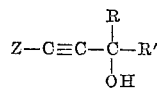

wherein (a) R is selected from the group consisting of hydrogen, an alkyl radical containing from 1 to 4 carbon atoms, inclusive, R' is selected from the group consisting of hydrogen, an alkyl radical containing from 1 to 4 carbon atoms, inclusive, and phenyl and Z is selected from the group consisting of chloro, bromo, iodo, chloromethyl, bromomethyl and iodomethyl and (b) R and R' taken together is pentamethylene and Z represents the above identified radicals, said halogenated acetylenic alcohol being present in an amount of from about 0.001 to 1 percent by weight based on the total weight of the aqueous colloidal dispersion.

7. An aqueous colloidal dispersion comprising (1) a synthetic latex containing in the disperse phase a copolymer of from 25 to 75 percent by weight of butadiene and correspondingly from 75 to 25 percent by weight of a vinyl aromatic hydrocarbon of the benzene series and (2) a halogenated acetylenic alcohol having the structure

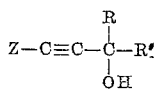

wherein (a) R is selected from the group consisting of hydrogen, an alkyl radical containing from 1 to 4 carbon atoms, inclusive, R' is selected from the group consisting of hydrogen, an alkyl radical containing from 1 to 4 carbon atoms, inclusive, and phenyl and Z is selected from the group consisting of chloro, bromo, iodo, chloromethyl, bromomethyl and iodomethyl and (b) R and R' taken together is pentamethylene and Z represents the above identified radicals, said halogenated acetylenic alcohol being present in an amount of from about 0.001 to 1 percent by weight based on the total weight of the aqueous colloidal dispersion.

8. An aqueous colloidal dispersion comprising (1) a synthetic latex containing in the disperse phase a polymer of at least one olefinically unsaturated monomer and (2) 3-iodo-2-propyn-1-ol in an amount of from about 0.001 to 1 percent by weight based on the total weight of aqueous colloidal dispersion.

9. A latex paint composition consisting of an aqueous colloidal dispersion comprising (1) a pigment, (2) a synthetic latex containing in the disperse phase a polymer of at least one olefinically unsaturated monomer, and (3) from about 0.01 to 1 percent by weight of a halogenated acetylenic alcohol wherein the amount is based on the total weight of latex paint and wherein said halogenated acetylenic alcohols are alkynols containing a hydroxyl group on the carbon atom adjacent to the acetylenic carbon atom and containing a halogen atom on the aliphatic portion of the molecule.

10. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinylaromatic hydrocarbon of the benzene series, and (3) from about 0.01 to 1 percent by weight of a halogenated acetylenic alcohol wherein the amount is based on the total weight of latex paint and wherein said halogenated acetylenic alcohols are alkynols containing a hydroxyl group on the carbon atom adjacent to the acetylenic carbon atom and containing a halogen atom on the aliphatic portion of the molecule.

11. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinyl aromatic hydrocarbon of the benzene series, and (3) from about 0.01 to 1 percent by weight of a halogenated acetylenic alcohol wherein the amount is based on the total weight of latex paint and wherein said halogenated acetylenic alcohols are alkynols containing a hydroxyl group on the carbon atom adjacent to the acetylenic carbon atom and containing a halogen atom on the aliphatic portion of the molecule.

12. A latex paint composition consisting of an aqueous colloidal dispersion comprising (1) a pigment, (2) a synthetic latex containing in the disperse phase a polymer of at least one olefinically unsaturated monomer and (3) from about 0.01 to 1 percent by weight based on the weight of latex paint of a halogenated acetylenic alcohol having the structure

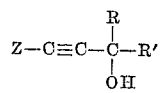

wherein (a) R is selected from the group consisting of hydrogen, an alkyl radical containing from 1 to 4 carbon atoms, inclusive, R' is selected from the group consisting of hydrogen, an alkyl radical containing from 1 to 4 carbon atoms, inclusive, and phenyl and Z is selected from the group consisting of chloro, bromo, iodo, chloromethyl, bromomethyl and iodomethyl, and (b) R and R' taken together is pentamethylene and Z represents the above identified radicals, wherein the amount is based on the total weight of latex paint.

13. A latex paint composition consisting of an aqueous colloidal dispersion comprising (1) a pigment, (2) a synthetic latex containing in the disperse phase a copolymer of from 25 percent to 75 percent of butadiene and correspondingly from 75 percent to 25 percent of a vinyl aromatic hydrocarbon of the benzene series, and (3) from about 0.01 to 1 percent by weight based on the total weight of latex paint of a halogenated acetylenic alcohol having the structure

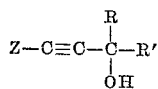

wherein (a) R is selected from the group consisting of hydrogen, an alkyl radical containing from 1 to 4 carbon atoms, inclusive, R' is selected from the group consisting of hydrogen, an alkyl radical containing from 1 to 4 carbon atoms, inclusive, and phenyl and Z is selected from the group consisting of chloro, bromo, iodo, chloromethyl, bromomethyl and iodomethyl and (b) R and R' taken together is pentamethylene and Z represents the above identified radicals, wherein the amount is based on the total weight of latex paint.

14. A method for rendering synthetic latex composition resistant to microbiological degradation, said synthetic latex composition containing in the disperse phase a polymer of at least one olefinically unsaturated monomer, which comprises the step of intimately blending in the composition a halogenated acetylenic alcohol in the amount of from about 0.001 to 1 percent by weight based on the total weight of synthetic latex at a temperature in the range of from 18° to 45° C. and wherein said halogenated acetylenic alcohols are alkynols containing a hydroxyl group on the carbon atom adjacent to the acetylenic carbon atom and containing a halogen atom on the aliphatic portion of the molecule.

15. A method of producing latex paint composition resistant to microbially induced degradation, said latex paint composition comprising a synthetic latex containing in the disperse phase a polymer of at least one olefinically unsaturated monomer, which comprises blending in the latex paint composition during its manufacture, a halogenated acetylenic alcohol in an amount of from about 0.01 to 1 percent by weight based on the total weight of latex paint and wherein said halogenated acetylenic alcohols are alkynols containing a hydroxyl group on the carbon atom adjacent to the acetylenic carbon atom and containing a halogen atom on the aliphatic portion of the molecule.

References Cited in the file of this patent

UNITED STATES PATENTS

| | | |
|---|---|---|
| 1,689,008 | Biddle | Oct. 23, 1928 |
| 2,749,377 | Johnston | June 5, 1956 |
| 2,847,392 | Eck | Aug. 12, 1958 |
| 2,888,421 | Adams et al. | May 26, 1959 |
| 2,957,761 | Davis | Oct. 25, 1960 |

OTHER REFERENCES

U.S. Dept. of Agriculture Tech. Bulletin, #162, March 1929, pages 47 and 48.

McLamore et al.: "Journal of Organic Chemistry," volume 20, No. 1, pages 109–110 (1955).